United States Patent
Mikulec et al.

(10) Patent No.: US 9,096,394 B2
(45) Date of Patent: Aug. 4, 2015

(54) SELF-CALIBRATING DOSING DEVICE

(71) Applicant: Schenck Process GmbH, Darmstadt (DE)

(72) Inventors: Michal Mikulec, Velka Dobra (CZ); Robert Weinand, Egelsbach (DE)

(73) Assignee: Schenck Process GmbH, Darmstadt (DE)

( * ) Notice: Subject to any disclaimer, the term of this patent is extended or adjusted under 35 U.S.C. 154(b) by 0 days.

(21) Appl. No.: 14/187,561

(22) Filed: Feb. 24, 2014

(65) Prior Publication Data

US 2014/0166438 A1 Jun. 19, 2014

Related U.S. Application Data

(63) Continuation of application No. PCT/EP2012/003570, filed on Aug. 23, 2012.

(30) Foreign Application Priority Data

Aug. 24, 2011 (DE) .......................... 10 2011 110 960

(51) Int. Cl.
*B65G 33/00* (2006.01)
*B65G 47/52* (2006.01)
*G01G 11/08* (2006.01)
*G01G 13/24* (2006.01)

(52) U.S. Cl.
CPC .............. *B65G 47/52* (2013.01); *G01G 11/086* (2013.01); *G01G 13/248* (2013.01)

(58) Field of Classification Search
CPC ......... B65G 33/24; B65G 33/14; B65G 33/22

USPC .................. 198/670, 671; 222/54, 55, 58, 57; 414/158; 700/230
See application file for complete search history.

(56) References Cited

U.S. PATENT DOCUMENTS

| | | | | |
|---|---|---|---|---|
| 5,154,326 A | * | 10/1992 | Chang et al. | 222/196 |
| 6,325,203 B1 | * | 12/2001 | Guliana | 198/670 |
| 8,201,708 B2 | | 6/2012 | Adelmann et al. | |
| 8,556,066 B2 | * | 10/2013 | Honegger | 198/550.3 |
| 8,636,138 B2 | * | 1/2014 | Blickley et al. | 198/657 |
| 2011/0035048 A1 | | 2/2011 | Mikulec et al. | |

FOREIGN PATENT DOCUMENTS

| | | |
|---|---|---|
| DE | 10 2007 055 566 A1 | 5/2009 |
| WO | WO 2005/105288 A1 | 11/2005 |
| WO | WO 2009/065524 A1 | 5/2009 |

* cited by examiner

*Primary Examiner* — James R Bidwell
(74) *Attorney, Agent, or Firm* — Muncy, Geissler, Olds & Lowe, P.C.

(57) ABSTRACT

A dosing device for bulk material having a dosing scale fastened to an outlet opening of a bulk material container. The dosing device comprises a motor-driven conveyor, extending substantially horizontally, which is designed to convey the bulk material from an entry region to an exit region. The entry region is arranged under the bulk material container. The exit region is supported on at least one first measurement device which is arranged and designed to determine the weight load of the conveyor by the bulk material. The conveyor is attached in a free floating manner to the bulk material container at the entry region thereof.

13 Claims, 1 Drawing Sheet

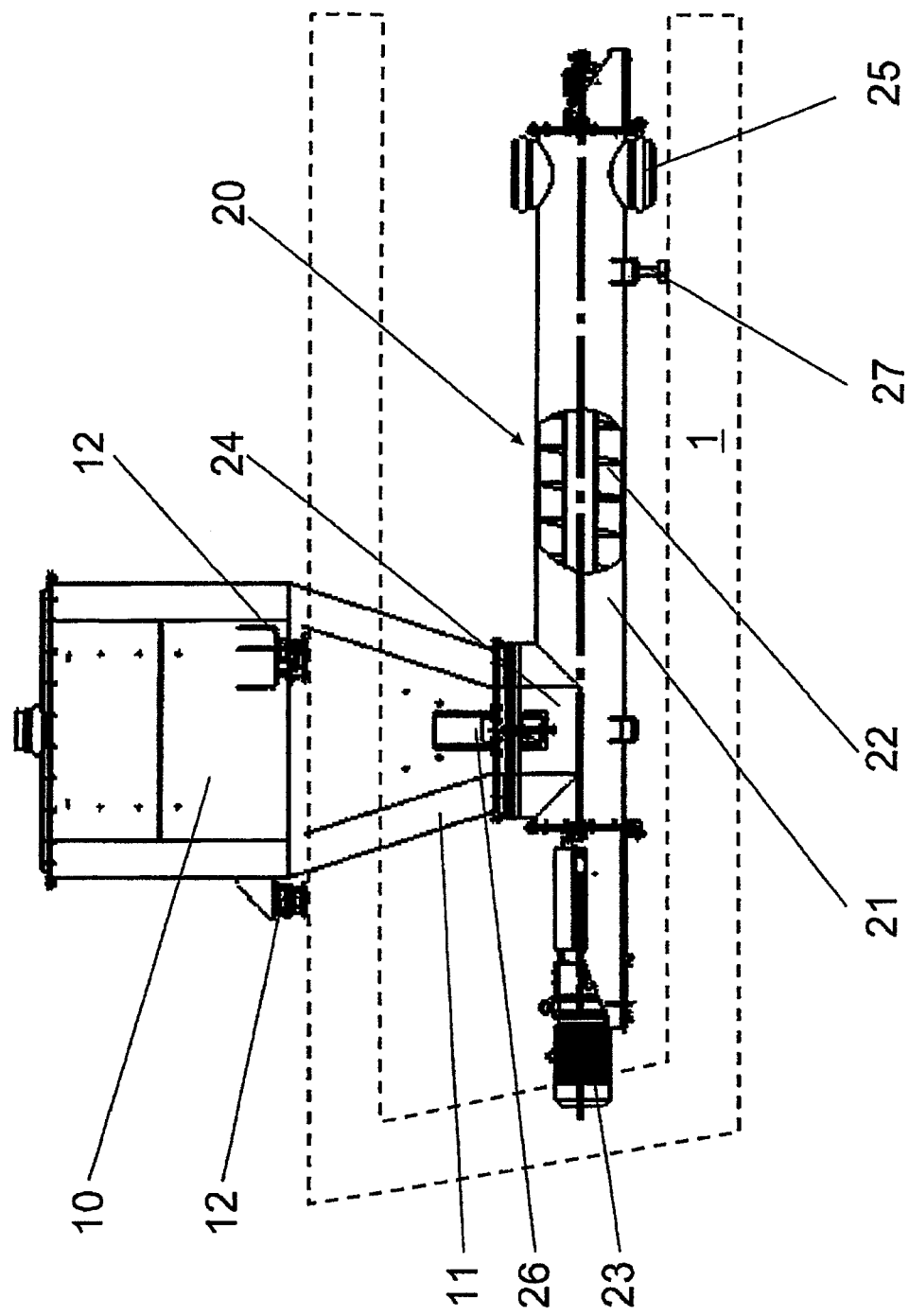

SELF-CALIBRATING DOSING DEVICE

This nonprovisional application is a continuation of International Application No. PCT/EP2012/003570, which was filed on Aug. 23, 2012, and which claims priority to German Patent Application No. DE 10 2011 110 960.2, which was filed in Germany on Aug. 24, 2011, and which are both herein incorporated by reference.

BACKGROUND OF THE INVENTION

1. Field of the Invention

The present invention relates to a dosing device for bulk material with a batch weighing scale attached to an outlet opening of a bulk material container. The invention also relates to a method for operating the dosing device.

2. Description of the Background Art

A dosing device with a batch weighing scale attached to an outlet of a container is known from WO 2009/065524 A1, which corresponds to US2011035048, and which is incorporated herein by reference. This batch weighing scale essentially comprises a horizontally extending conveyor that preferably can be a screw conveyor, and that is supported by a number of bearing devices on a fixed supporting framework. Provided between the supporting framework and the conveyor are a number of measuring devices that are arranged and designed so as to continuously sense the weight of the bulk material being conveyed by the conveyor. The conveyor is motor driven and is designed to convey the relevant bulk material in the prescribed direction from a receiving area to a discharge area.

Attached to the floor of the container is a vertical filling tube, which is routed to the receiving area of the conveyor. The container stores at least a portion of the bulk material to be conveyed, and, in cooperation with the filling tube, forms a feeder for the conveyor. An agitator may be provided in the container, by which means bulk materials, for example those which flow poorly, can be agitated, so that it is possible to ensure a mass flow in the container for uniform loading of the conveyor.

The container, or the filling tube attached to its floor, and the conveyor preferably are mechanically decoupled from one another in order to prevent motions that arise in the container from affecting the measurement results in weight sensing with the conveyor. In the case of a screw conveyor, decoupling is accomplished with a flexible collar, for example, that connects the filling tube of the container and a pipe fitting at the receiving area of the conveyor.

WO 2009/065524 A1 proposes a fully floating support of the conveyor so that exclusively the weight of an applicable conveyor is sensed in the continuous measurement. To this end, the conveyor is supported on the bottom by a number of self-aligning bearings on the supporting framework, wherein at least one self-aligning bearing has an integrated force transducer. The self-aligning bearings are located at each of the two ends of the essentially horizontal conveyor. In the conveying operation, the vertically flowing bulk material is redirected in a horizontal direction by the conveyor and is removed from the conveyor's receiving area.

However, in the conventional art, improvement is needed in that, especially for bulk materials with poor flow properties, extremely varying vertical forces can be caused by the continuing vertical flow of bulk material. These forces can be transmitted through the bulk material to the conveyor and thereby to the self-aligning bearings that are located under the conveyor at the receiving area. These forces can result in distortion of the measured values in weight sensing.

SUMMARY OF THE INVENTION

It is therefore an object of the present invention to eliminate measurement errors resulting from vertical forces, in particular for bulk materials with poor flow properties, and to increase the measurement accuracy of a dosing device having an essentially horizontal conveyor located at a container.

Accordingly, the object is attained in an embodiment by a dosing device for bulk material that comprises a motor-driven conveyor that is located at an outlet opening of a bulk material container and is essentially horizontal. The conveyor is designed to convey the bulk material from an entry region to an exit region. The entry region is located beneath the bulk material container and the exit region is supported on the at least one measuring device.

The first measuring device is arranged and designed so as to ascertain the weight loading of the conveyor by the bulk material.

Together with the supported conveyor, the measuring device, which can be implemented as a load cell or weighing cell, for example, forms a batch weighing scale with which a mass flow of the bulk material conveyed in the conveying direction can be sensed continuously.

The conveyor is attached to the bulk material container in a free-floating manner at the entry region.

Because of the free-floating suspension of the conveyor, and consequently also of the batch weighing scale, on the bulk material container, the effects of extremely varying vertical forces, i.e., impulsive or jerky in nature, for example, on the measuring device are efficaciously suppressed. Sensing of the weight loading by the bulk material is accomplished with the measuring device, which is located on the side opposite the entry region for the bulk material. The measuring device is thus located outside the critical region in which the varying vertical forces (i.e., the interfering forces) could be coupled into the batch weighing scale.

Screw conveyors are suitable by preference as conveyors for conveying bulk materials having poor flow properties, in particular. A screw conveyor of this type comprises at least one outer housing in the tubular interior of which a rotatably supported screw conveyor is located. The screw conveyor has a shaft that is driven by an external motor and is surrounded by a screw thread.

The free-floating suspension can also be suitable for a conveyor belt, a chain conveyor, or a slat conveyor, for example, in order to efficaciously suppress the varying vertical forces on the applicable conveyor during weighing from bulk material sliding downward.

The dosing device can comprise electronic component that are designed to ascertain the mass flow that is conveyed by the conveyor. The mass flow is obtained as a function of the sensed weight loading of the conveyor and the conveyor speed, which depends on the speed of the motor drive of the conveyor.

In advantageous manner, the electronic component can include a control loop with which the conveying speed of the conveyor is to be controlled such that the conveyed mass flow remains constant.

The bulk material container can be supported on a number of second measuring devices that is/are arranged and designed to ascertain the total weight loading of the container and the conveyor caused by the bulk material.

Furthermore, the electronic component can be designed to sense a decrease in the total weight loading over time by means of the second measuring device(s) and to compare it with the bulk material mass conveyed by the conveyor, and if applicable provide a correction factor for ascertaining the conveyed mass flow.

Also, the bulk material container can include an agitator that is designed to agitate the bulk material. In this way, a mass flow can be established in the material container, in particular in the case of bulk materials with poor flow characteristics.

In another, especially embodiment, the conveyor can be suspended in a free floating manner from the bulk material container at the entry region by means of at least one third measuring device. The measuring devices are arranged and designed so as to sense the vertically acting forces between the bulk material container and the conveyor.

The third measuring device(s) can be in connection to electronic component that are designed to control the agitator in the bulk material container as a function of the measured vertically acting forces such that a homogeneous flow behavior is established in the bulk material container.

The invention further comprises a method for operating a dosing device for bulk material in accordance with the invention. The method can comprises at least the following steps: measuring the weight loading of the conveyor via at least one first measuring device; ascertaining the mass flow of the bulk material conveyed in the conveyor from the conveyor speed and the weight loading of the conveyor and from a correction factor; comparing the ascertained mass flow with a predetermined nominal value for the mass flow; and adjusting the conveyor speed of the conveyor as a function of the comparison between the ascertained mass flow and the nominal value for the mass flow.

During operation of the dosing device, the method can provide for a cyclically repeating control measurement that additionally comprises at least the following steps: measuring the total weight loading of the bulk material container and the conveyor via at least one second measuring device; ascertaining the decrease in total weight loading during a defined time period; ascertaining the bulk material mass conveyed during the defined time period by the conveyor; ascertaining the correction value from the quotient of the ascertained decrease in total weight loading and the ascertained bulk material mass conveyed by the conveyor; and adjusting the correction value.

Furthermore, the invention comprises a method for providing an agitator regulation for operating a dosing device, comprising the following steps: measuring the vertical forces acting between the bulk material container and the conveyor via at least one third measuring device; ascertaining and analyzing a signal behavior over time of the measured vertical forces; and adjusting an agitator speed of the agitator in the bulk material container as a function of the ascertained and analyzed signal behavior.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the sole FIGURE shows a schematic representation of a dosing device with a bulk material container and a conveyor in the form of a screw conveyor located on the container.

DETAILED DESCRIPTION

In the embodiment shown, the bulk material container is a cylindrical bulk material container 10 attached to a support structure 1 and attached by way of example to an upper longitudinal member of a trapezoidal support structure 1 (made of steel beams, for example). A discharge section 11 that tapers conically downward to an outlet port is attached to the container floor. Provided between the bulk material container 10 and the support structure 1 are a number of measuring devices (bearing devices) 12, by means of which the bulk material container 10 is supported relative to the support structure 1.

Arranged inside the bulk material container 10 is an agitator, not shown in the drawing, which extends into the discharge section 11 if applicable. Bulk materials, in particular those which flow poorly, can be agitated with the agitator.

As a result of the agitation of the bulk material with the agitator, a mass flow takes place in the discharge section 11 that can be delivered to the conveyor 20 via the outlet port. The conveyor 20 is arranged beneath the discharge section 11, and is designed to remove the bulk material that was stored by the bulk material container 10, agitated, and metered out at the outlet opening.

The bulk material container 10 with its integrated agitator, in combination with the discharge section 11, can thus be considered a feeder for the conveyor 20.

The conveyor 20 comprises an elongated, essentially tubular, housing 21 in the interior of which a screw conveyor 22 preferably is rotatably supported. The screw conveyor 22 is driven by a drive motor 23. In the receiving area or entry region of the conveyor 20, i.e., at the left end of the conveyor 20 as shown, there is provided an entry region (intake flange) 24, which extends through a corresponding opening into the interior of the tubular housing 21. On the opposite end, the tubular housing 21 has a lower opening that terminates in an exit region (discharge tube) 25 and defines the discharge area or exit region for the bulk material conveyed by the conveyor 20.

The outlet port of the feeder 10, 11 is connected to the intake flange 24 by a flexible connection. The feeder 10, 11 and the conveyor 20 are mechanically decoupled from one another by the flexible connection, which can be achieved by means of a flexible collar fastened coaxially around the lower end of the discharge section 11 and the upper end of the intake flange 24. The conveyor 20 and the feeder 10, 11 can perform motions separately from one another and are thus decoupled from one another, in particular vibrationally as well.

The conveyor 20 is supported on the support structure (supporting framework) 1 on the side of the discharge area, i.e., on the right side as shown in the drawing, by at least one first measuring device (bearing device), which is labeled with the reference symbol 27 in the drawing. Integrated into the bearing device 27 is a force measuring device with which the weight loading acting on the bearing device can be sensed. The force measuring device can comprise a load cell or a weighing cell, for example.

This bearing device 27 is located in the vicinity of the discharge tube 25 and can be located to the left of the discharge tube 25, as illustrated, but can also be located on the right side of the discharge tube 25. Two bearing devices can also be located symmetrically to the center line of the conveyor 20 near the discharge tube 25.

The conveyor 20 is suspended in a free-floating manner from the feeder 10, 11 on the end opposite the discharge tube 25, which is to say on the left side of the drawing, which is to say according to FIG. 1, by means of links 26.

With its free-floating suspension on the side of the receiving area and the weight-measuring bearing on the support structure 1 on the discharge side, the conveyor 20 constitutes a batch weighing scale that permits continuous gravimetric sensing of the conveyed mass flow.

During conveying or dosing operation, the bulk material is redirected at the outlet port of the discharge section 11 from its vertical flow direction into a horizontal direction in the receiving area of the conveyor 20. In this process, different vertical forces can arise, depending on the bulk material properties, the geometric design of the feeder 10, 11, and its inner wall surfaces, for example. Due to the agitation of the bulk material performed by the agitator, these vertical forces can vary enormously, which is to say that they may in particular occur in a pulsed fashion. These pulsed or jerkily varying vertical forces occur in particular in the case of bulk materials with poor flow properties, and in prior art batch weighing scales for gravimetric determination of a mass flow, they regularly lead to distorted weight measurements, since the prior art batch weighing scales must also be supported on the supporting structure by means of bearing devices under the receiving area.

With the free-floating suspension of the conveyor 20 from the feeder 10, 11, which is accomplished on the receiving area side by the links 26, the interfering signals caused by the agitation are efficaciously prevented from affecting the weight sensing.

The weight of the bulk material located in the conveyor 20 and conveyed by the screw conveyor 22 is continuously sensed with the measuring device integrated into the bearing device 27. The relevant current mass flow of the bulk material conveyed horizontally is obtained through multiplication by the conveying speed of the conveyor 20, which is determined by the speed of the drive motor 23. The current mass flow is regulated to a nominal value as the controlled variable of a control loop by means of the speed of the drive motor 23 in order to ensure constant conveying.

Furthermore, the dosing device shown is equipped with an apparatus for automatic calibration of the batch weighing scale. To this end, each bearing device 12 by means of which the feeder 10, 11 of the conveyor 20 is supported on the supporting structure 1 is equipped with a weighing cell. The weight of the feeder 10, 11 and the suspended conveyor 20 is sensed with these weighing cells of the bearing devices 12. During ongoing conveying operation, the mass of the bulk material stored in the bulk material container decreases continuously. This weight decrease is sensed with the weighing cells integrated into the bearing devices 12. At defined time intervals, the weight decrease determined by the bulk material container supported in a weight-measuring manner is compared with a value resulting from the conveyed bulk material mass ascertained for the same time period with the batch weighing scale. The conveyed bulk material mass is calculated essentially as the product of the sensed weight and the conveying speed of the conveyor 20 or from the time integral over the sensed mass flow.

If the conveyed bulk material mass measured with the conveyor 20 deviates from the weight difference that was ascertained with the control measurement via the bulk material container 10 supported on weighing cells, then the measurement result sensed with the conveyor 20 is appropriately adjusted or corrected with a correction factor. The time intervals for such a calibration and the quantitative adoption of the correction values can take place in an automated fashion, for example by means of an applicable control and regulation device.

In useful fashion, each of the links 26 by which the conveyor 20 is suspended from the feeder 10, 11 in the receiving area have at least one measuring device in the form of a load cell or weighing cell, with which the pulsed or jerkily varying vertical forces caused by the agitation of the bulk material can be sensed. These signals sensed with the measuring devices can be analyzed and provide information on the flow behavior of the bulk material flowing in the feeder 10, 11. A control signal, with which the agitator and the agitation process taking place in the bulk material container 10 and/or in the discharge section 11 can be regulated or controlled, can be generated from the sensed signals. A uniform mass flow for uniform loading of the conveyor 20 can be achieved by means of this control or regulation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A dosing device for bulk material with a support structure having at least an upper beam and a lower beam and a motor-driven conveyor that is arranged at an outlet opening of a bulk material container and is essentially horizontal,
   wherein the bulk material container is supported on the upper beam of the support structure,
   wherein the conveyor conveys the bulk material from an entry region to an exit region,
   wherein the entry region is located beneath the bulk material container,
   wherein, out of the entry region and the exit region of the conveyor, solely the exit region is supported on the lower beam of the support structure,
   wherein the exit region is supported on the lower beam by at least one first measuring device, which is arranged and designed so as to ascertain a weight loading of the conveyor by the bulk material, and
   wherein the conveyor is attached to the bulk material container in a free-floating manner at the entry region.

2. The dosing device according to claim 1, wherein the conveyor is a screw conveyor, a conveyor belt, a chain conveyor, or a slat conveyor.

3. The dosing device according to claim 1, wherein an electronic component is provided that ascertains a mass flow that is conveyed as a function of a sensed weight loading of the conveyor and a speed of the motor drive of the conveyor.

4. The dosing device according to claim 3, wherein the electronic component controls a conveying speed of the conveyor such that the conveyed mass flow remains constant.

5. The dosing device according to claim 1, wherein the bulk material container is supported on at least one second measuring device that is arranged and designed so as to ascertain a total weight loading of the container and the conveyor caused by the bulk material.

6. The dosing device according to claim 3, wherein the electronic component senses a decrease in a total weight loading over time via the second measuring devices and compares it with the bulk material mass conveyed by the conveyor, and if applicable provides a correction factor for ascertaining the conveyed mass flow.

7. The dosing device according to claim 1, wherein the bulk material container includes an agitator that is designed to agitate the bulk material.

8. The dosing device according to claim 5, wherein the conveyor is suspended in a free floating manner from the bulk material container at the entry region by at least one third measuring device that is arranged and configured so as to sense vertically acting forces between the bulk material container and the conveyor.

9. The dosing device according to claim 7, wherein an electronic component is arranged to control the agitator in the bulk material container as a function of the measured vertically acting forces such that a homogeneous flow behavior is established in the bulk material container.

10. A method for operating a dosing device for bulk material according to claim 1, the method comprising:
 a) measuring the weight loading of the conveyor solely via the at least one first measuring device;
 b) ascertaining the mass flow of the bulk material conveyed in the conveyor from a conveyor speed and the weight loading of the conveyor and from a correction factor;
 c) comparing the ascertained mass flow with a predetermined nominal value for the mass flow; and
 d) adjusting the conveyor speed of the conveyor as a function of the comparison between the ascertained mass flow and the predetermined nominal value for the mass flow.

11. The method according to claim 10, wherein a cyclically repeating control measurement is performed during operation of the dosing device, comprising the following steps:
 i) measuring the total weight loading of the bulk material container and the conveyor via at least one second measuring device;
 ii) ascertaining a decrease in total weight loading during a defined time period;
 iii) ascertaining a bulk material mass conveyed during the defined time period by the conveyor;
 iv) ascertaining a correction value from the quotient of the ascertained decrease in total weight loading and the ascertained bulk material mass conveyed by the conveyor; and
 v) adjusting the correction value for step b).

12. A method for providing an agitator regulation for operating a dosing device for bulk material according to claim 1, the method comprising:
 1) measuring vertical forces via at least one additional measuring device acting between the bulk material container and the conveyor;
 2) ascertaining and analyzing a signal behavior over time of the measured vertical forces; and
 3) adjusting an agitator speed of the agitator in the bulk material container as a function of the ascertained and analyzed signal behavior.

13. A dosing device for bulk material comprising:
 a support structure having at least an upper beam and a lower beam;
 a bulk material container supported on the upper beam of the support structure, the bulk material containing having an outlet opening;
 a conveyor arranged at the outlet opening of a bulk material container, the conveyor having an entry region that receives the bulk material from the bulk material container and an exit region where the bulk material exits the conveyor, the conveyor at least partly supported by the lower beam of the support structure;
 wherein, out of the entry region and the exit region of the conveyor, solely the exit region is supported on the lower beam of the support structure,
 wherein the exit region of the conveyor is supported on the lower beam by at least one bearing device that measures a weight loading of the conveyor by the bulk material.

* * * * *